United States Patent
Kiilerich et al.

(10) Patent No.: US 12,030,796 B2
(45) Date of Patent: Jul. 9, 2024

(54) METHOD AND SYSTEM FOR ABATING THE PRESENCE OF A SELECTED CHEMICAL SUBSTANCE IN WASTEWATER FLOWING IN A WASTEWATER CHANNEL SYSTEM

(71) Applicant: Grundfos Holding A/S, Bjerringbro (DK)

(72) Inventors: Bruno Kiilerich, Bjerringbro (DK); Martin Hørlück Lyngsø, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 569 days.

(21) Appl. No.: 17/100,757

(22) Filed: Nov. 20, 2020

(65) Prior Publication Data
US 2021/0155513 A1 May 27, 2021

(30) Foreign Application Priority Data
Nov. 21, 2019 (EP) .................................... 19210617

(51) Int. Cl.
*C02F 1/68* (2023.01)
*C02F 1/00* (2023.01)
(Continued)

(52) U.S. Cl.
CPC .............. *C02F 1/683* (2013.01); *C02F 1/008* (2013.01); *C02F 1/686* (2013.01); *G05D 21/02* (2013.01); *C02F 2101/101* (2013.01); *C02F 2201/002* (2013.01); *C02F 2209/00* (2013.01); *C02F 2209/003* (2013.01); *C02F 2209/005* (2013.01); *C02F 2209/006* (2013.01);
(Continued)

(58) Field of Classification Search
None
See application file for complete search history.

(56) References Cited

U.S. PATENT DOCUMENTS 5,242,602 A * 9/1993 Richardson ........ G01N 33/1813
436/171
5,620,609 A * 4/1997 Field ...................... G01N 21/53
210/709

(Continued)

OTHER PUBLICATIONS

Extended European Search Report; European Patent Office; European Patent Application No. 19210617.7; May 29, 2020; 13 pages.

*Primary Examiner* — Clare M Perrin
(74) *Attorney, Agent, or Firm* — Taft Stettinius & Hollister LLP (57) ABSTRACT

The present invention relates to a system and a method for abating the presence of a selected chemical substance in wastewater flowing in a wastewater channel system from an upstream position to a downstream position. The method typically comprising dosing into the wastewater, at the upstream position, chemical agent(s) adapted to abate the presence of said selected chemical substance, wherein the dosing is in an amount set by a dosing set-point, and adjusting the dosing set-point based on determinations of the concentration of the selected chemical substance at the downstream position. The invention involves comparison between a determined concentration and a pre-selected fractile and adjusting a dosing set-point based thereon.

18 Claims, 6 Drawing Sheets

(51) Int. Cl.
*G05D 21/02* (2006.01)
*C02F 101/10* (2006.01)

(52) U.S. Cl.
CPC ...... *C02F 2209/26* (2013.01); *C02F 2303/02* (2013.01); *C02F 2303/18* (2013.01); *C02F 2305/00* (2013.01); *C02F 2307/08* (2013.01)

(56) References Cited

U.S. PATENT DOCUMENTS

| | | | |
|---|---|---|---|
| 2007/0074758 A1* | 4/2007 | McQuade | ............... C02F 1/008 137/561 R |
| 2014/0131259 A1 | 5/2014 | Goldblatt | |

* cited by examiner

METHOD AND SYSTEM FOR ABATING THE PRESENCE OF A SELECTED CHEMICAL SUBSTANCE IN WASTEWATER FLOWING IN A WASTEWATER CHANNEL SYSTEM

CROSS-REFERENCE TO RELATED APPLICATIONS

This application is a U.S. Nonprovisional Application of European Patent Application No. 19210617.7 filed on Nov. 21, 2019, which is incorporated herein by reference in its entirety.

FIELD OF THE INVENTION

The present invention relates to a system and a method for abating the presence of a selected chemical substance in wastewater flowing in a wastewater channel system from an upstream position to a downstream position. The method typically comprising dosing into the wastewater, at the upstream position, chemical agent(s) adapted to abate the presence of said selected chemical substance, wherein the dosing is in an amount set by a dosing set-point, and adjusting the dosing set-point based on determinations of the concentration of the selected chemical substance at the downstream position. The invention involves comparison between a determined concentration and a pre-selected fractile and adjusting a dosing set-point based thereon.

BACKGROUND OF THE INVENTION

Abatement of sulphide by feedback control is today done according to the highest H2S peak within a given time window. The dosing set-point will increase proportional to the size of H2S peaks above the threshold. This implies that overdosing will be done as the algorithm will adjust to the most extreme H2S peak experienced.

In systems (like the one shown in FIG. 1, without sidebranches) with large peaks arriving infrequently (e.g. A, B, C), a drastically increased dosing to combat the H2S (proportional to the difference between threshold and peak height) may occur. However, as the peaks are arriving infrequently, the next large peak might not arrive within 1 day, 3 days, 1 week or even 1 month. As the dosing set-point has been increased, and because peaks arriving after this dramatic increase, is under the threshold, the dosing strategy will gradually reduce the set-point again. In order not to make an unstable system, this reduction typically takes a while, and meanwhile this reduction takes place, overdosing of chemicals takes place.

Hence, an improved method and system setting a dosing set-point would be advantageous, and in particular a more efficient and/or reliable method and system would be advantageous.

OBJECT OF THE INVENTION

It is an object of the invention to provide a method and system which at least alleviate overdosing of chemicals into wastewater system. It is a further object of the present invention to provide an alternative to the prior art.

SUMMARY OF THE INVENTION

Thus, the above-described object and several other objects are intended to be obtained in a first aspect of the invention by providing a method for abating the presence of a selected chemical substance in wastewater flowing in a wastewater channel system from an upstream position to a downstream position, the method comprising
dosing into the wastewater, at the upstream position, chemical agent(s) adapted to abate the presence of said selected chemical substance, wherein the dosing is in an amount set by a dosing set-point, and
adjusting the dosing set-point based on determinations of the concentration of the selected chemical substance, or any other compound, at the downstream position,
defining a threshold for the selected chemical substances;
determining a value of a pre-selected fractile based on a set of data comprising time series of concentration determinations of the selected chemical substance at the downstream position,
wherein adjusting the dosing set-point comprising:
obtaining a determination of concentration of the selected chemical substance, or any other substance, at the downstream position, and
i) if the determined concentration is lower than the value of the pre-selected fractile:
adjusting the dosing set-point based on the difference between the determined concentration and the threshold,
ii) if the determined concentration is higher than the value of the pre-selected fractile:
a) adjusting the dosing set-point based on the difference between the value of the pre-selected fractile and the threshold.

To avoid overdosing, the present invention aims at reducing the dosing set-point when H2S peaks in the analysed time window is below the threshold. Due to the reduction, one may sometimes experience small H2S peaks above the threshold (this is the trade off from saving chemicals). Besides avoiding over dosage, another benefit of dynamically reducing and increasing the dosing set-point, is that the method may be configured to adapt automatically to seasonal variations in the production of H2S. The invention is found to enable one to abate sulphides to a certain extent in branched sewer systems like those disclosed herein, which was not possible using the prior art algorithms.

The invention resides inter alia in that chemical substances are formed in and/or released e.g. as a gas from wastewater during transport towards e.g. a wastewater treatment facility. This is due to presence in the wastewater of chemical and biological reactants and microorganisms that may interact to form other chemical substances or be released from the wastewater e.g. to form a gas or other volatile substances evaporating from the wastewater. The present invention has been found to be particular useful for abatement of formation of e.g. sulphide, but abatement of other chemicals such as other foul smelling sulphurous compounds, methane or laughter gas may be performed by the present invention.

As a non-limiting example, when abatement of sulphide is aimed at, chemical agent(s) is(are) added to the wastewater to counter act the process that takes place where sulphide is formed in the wastewater. Accordingly, adapted to react with chemical substances includes the process of counter acting such processes and/or render chemical substances harmless by e.g. oxidation and/or precipitation. Another non-limiting example involve increasing the pH of wastewater to keep sulphide in the wastewater by changing the equilibrium concentration towards the ionic form HS⁻ which cannot evaporate from the wastewater thereby hinder nuisances from $H_2S$. In one preferred embodiment involving increase of the pH, the pH is increased by dosing e.g. NaOH into the wastewater.

Some other ways, in accordance with preferred embodiments of the invention of coping with sulphides are listed in the following:

Nitrate (NO3−) and oxygen (O2) can be used to avoid formation of sulphides in the wastewater.

Sodium hydroxide (NaOH) or Magnesium hydroxide (Mg(OH)2) can be used to increase pH and thereby change the equilibrium towards HS—that cannot evaporate from the wastewater.

Sodium hydroxide (NaOH) can also be chock dosed which will disrupt the biofilm and thus the biological activity Hydrogen peroxide (H2O2) or hypochlorite (ClO—) can be used to oxidise sulphide to none problematic forms such as sulphate, thiosulphate or elemental sulphur.

Iron salts can be used to precipitate sulphides, as ferrous iron ($Fe^{2+}$) reacts with sulphide ($S^{2-}$) and precipitates as ferrous sulphide (FeS).

Abate as used herein in connection with "abating the presence of a selected chemical substance", typically but not exclusively refers to reducing and even avoiding the amount of the selected chemical substance by formation of the chemical substance or taking care of it after it has formed.

The invention has mainly been described with reference to abatement of presence of a selected chemical substance. However, the invention is not to be seen as limited to a single selected chemical substance since the invention may be applied to different selected chemical substances. In such embodiments, the invention is/are typically applied in a parallel or sequential manner for each selected chemical substance, but in case of e.g. collective determinations of concentrations of multiple selected chemical substances, the invention may be applied to such collective determinations.

Wastewater as used herein is preferably used to reference, such as waste sources put into a sewer system.

Fluid as used herein is used to reference a fluid in a gas or liquid phase.

Determination of concentration as used herein refers typically but not exclusively to e.g. a measurement provided by a sensor configured to measure the concentration of the selected chemical substance or a measurement of a concentration of a chemical substance indicative of the concentration of the selected chemical substance. In the latter case, the obtained concentration can be transformed e.g. by correlative relations into the concentration of the selected chemical substance.

Fractile is typically used to refer to a cut point dividing data. For instance, a 95% fractile refers to that 95% of data is below the fractile.

Value of fractile is used to refer to the value corresponding to the fractile. As example, a fractile is referred to as e.g. 95% and the value of the fractile is the value of the data at 95% fractile e.g. x ppm ("x" means a numerical number). Similarly, a value fractile range is typically a range defined as [0; x ppm] where x ppm is the value of the of the data at the selected fractile.

The individual aspects and embodiments of the present invention may each be combined with any of the other aspects and embodiments. These and other aspects of the invention will be apparent from the following description with reference to the described embodiments.

BRIEF DESCRIPTION OF THE FIGURES

The present invention and preferred embodiments thereof will now be described in more detail with regard to the accompanying figures. The figures show ways of implementing the present invention and are not to be construed as being limiting to other possible embodiments falling within the scope of the attached claim set.

DETAILED DESCRIPTION OF PREFERRED EMBODIMENTS

The following disclosure of the invention is made with reference to abatement of $H_2S$ in wastewater. However, the invention is not intended to be limited to such application.

Figure 1:
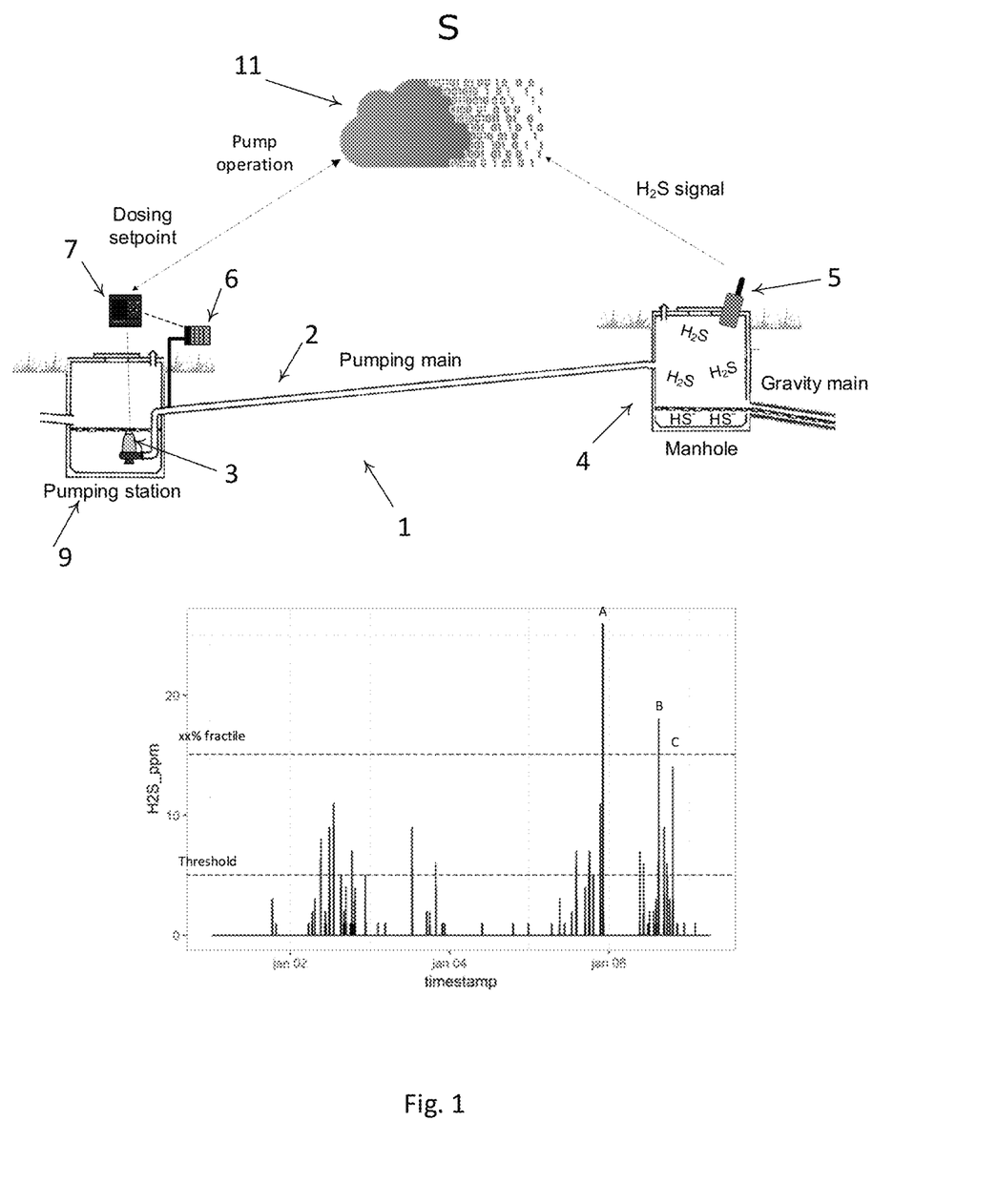
FIG. 1 is a schematic illustration of an embodiment of the invention employed in a wastewater system and determinations of concentration obtained from the wastewater system.

Reference is made to FIG. 1 schematically illustrating a wastewater channel system 1 (left side of FIG. 1) and determinations of $H_2S$ concentrations (right hand side of FIG. 1 in the manhole) over the indicated time period.

As illustrated in FIG. 1, the wastewater channel system comprises in the shown embodiment, a pumping main 2 being a line through which wastewater is pumped by the illustrated pump 3. The wastewater is pumped towards a manhole 4 in which a datalogger 5 and sensor 10 are arranged. A manhole, as used, herein is typically a construction allowing access to the wastewater. The datalogger 5 is in data connection with the sensor 10 configured for determining the concentration of $H_2S$ (or other substance(s)) and for providing readouts for the datalogger 5. The datalogger 5 receiving readouts from the sensor is configured to log the readouts and convey the readouts to e.g. (as illustrated) a data cloud or a database in general. The sensor 10 is typically arranged so as to determining the concentration of $H_2S$ (or other substance) in a gas phase above or directly in the liquid wastewater in the manhole 4. The flow of wastewater in the FIG. 1 is from the position of the pump 3 arranged in a pumping station (or pumping pit) 9 towards and into the manhole 4. Thereby, the manhole 4 is positioned downstream of the pump 3. Wastewater leaving the manhole 4 flows through a gravity main to a further downstream position. It is noted, that the gravity main may alternatively be a pumping main and the upstream pumping main 2 may be a gravity main.

At a position upstream of the manhole 4 and thereby upstream of the datalogger 5 and sensor 10, a dosing unit 6 is arranged. The dosing unit 6 is a unit which is adapted to dose a predetermined amount of a substance in response to receiving a control signal indicative of the predetermined amount. The dosing unit 6 doses the substance into the wastewater e.g. through a connection into the pumping main. Alternatively, the dosing may be performed by dosing into a pump sump, provided in the bottom of the pumping station 9 (and/or dosing directly into the sump of the pumping station). The pump sump is typically provided by the fluid connections into or out from void of the manhole is arranged at an elevated position relatively to the bottom of the manhole, thereby providing a volume in which fluid can be accumulated. The pump 3 is typically arranged in the manhole so as to suck and pump fluid from the pump sump.

In some embodiments, the pump runs intermittently, and in such embodiments, the dosing is typically synchronized with the run of the pump so that dosing occurs only during the time where the pump is running, thereby pumping wastewater towards the downstream manhole.

The pump 3 and the dosing unit 6 are controlled by a control unit 7, typically so that activation of the pump 3 to pump wastewater and dosing of the substance by the dosing unit 6 is controlled on-off by control signals transmitted by the control unit 7; this is indicated in FIG. 1 left hand side by dotted lines.

The amount dosed is referred herein as a dosing set-point. Depending on whether the dosing is a continuous or batchwise dosing, the dosing set-point may be expressed ml/m$^3$, that is the amount of chemicals in millilitre per cubic meter wastewater. Alternatively, the dosing set point may be expressed in amount units (e.g. milligram) per time unit (e.g. seconds) or a total amount in e.g. milligrams of a chemical substance to be dosed. Thus, the control unit typically controls the dosing unit to dose in accordance with the dosing set-point.

In the embodiment shown in FIG. 1, data, that is $H_2S$ concentrations, obtained by the datalogger 5 with sensor 10 is send to a cloud 11. In the embodiments shown, data pertaining to the pump operation is also send to the cloud 11, but this is considered an optional feature. The dosing set-point is disclosed as received from the cloud 11. In such embodiments, the cloud 8 is in data connection with a (not shown) computational facility, such as a computer, which provides the dosing set-point to the cloud 11 from which the control unit 7 receives the dosing set-point. In alternative configuration, the control unit 7 is adapted to provide a dosing set-point on its own based on data retrieved from the cloud 11. It is noted that the cloud implementation not is considered mandatory for the present invention, since data may be stored e.g. in the control unit 7 being in data communication with the datalogger 5.

The right hand side of FIG. 1 illustrates a typical time series of determined concentration of $H_2S$ by use of the datalogger 5 with sensor 10 in the manhole 4. The concentrations determined are for a wastewater to which a chemical substance is added in order to abate formation of $H_2S$. FIG. 1 also illustrates a threshold which may be considered a maximum desired concentration of $H_2S$. The magnitude of the threshold is typically set by a user defining a level which it is desired not to exceed. As illustrated, most of the concentrations obtained are below the threshold but some exceed the threshold to a high extend (see spikes labelled A, B, C). This may be taken as an indication on that the dosing set-point is to be adjusted.

If an adjustment e.g. an increase of the dosing set-point is based on the values of e.g. one or more of the spikes A, B and/or C, that would most often result in an undesired overdosing regime as the result will be that the majority of concentrations will become far lower than threshold, and the following description of a preferred embodiment suggest an improved alternative to setting the dosing set-point based on the magnitude of the spikes.

The method is used for abating the presence of a $H_2S$ in wastewater flowing in a wastewater channel system 1 from an upstream position to a downstream position 4. As disclosed above in connection with FIG. 1, the method comprising dosing into the wastewater, at the upstream position, chemical agent(s) adapted to abate the presence of $H_2S$ and dosing in an amount set by the dosing set-point.

The method also includes adjusting the dosing set-point based on determinations of the concentration of $H_2S$ at the downstream position by the datalogger 5 with sensor 10 as well as defining a fractile for $H_2S$.

The method has access to a set of data comprising time series of concentration determinations of the selected chemical substance at the downstream position. Such a set of data could be like the data shown to the right in FIG. 1 and the set of data may be stored in the cloud 11. From this set of data a value of a pre-selected fractile is determined. In FIG. 1, right hand side, the fractile is shown by a dotted line labelled XX % fractile. The determination of the value pre-selected fractile is determined by use of ordinary statistical method on the basis pre-selected fractile. The pre-selected fractile may typically be set by a user and is typically set in a range between [75%; 99.5%].

Adjustment of the dosing set-point according to the present invention typically comprises a determination of concentration of H2S at the downstream position. Based on the determined concentration, it is determined if the determined concentration is lower than the value of the pre-selected fractile and in confirmative case, adjusting the dosing set-point based on the difference between the determined concentration and the threshold.

It is noted, that the difference between the determined concentration and the threshold is determined with a numerical sign (plus or minus) e.g. as $$\Delta = \text{Determined concentration} - \text{threshold}$$

This implies that if the difference, A, is larger than zero, the dosing set-point will be increased and if smaller than zero, the dosing set-point will be decreased. A number of different schemes can be used to calculate the actual change in dosing set-point as will be detailed below.

In some situations, the determined concentration is higher than the value of the preselected fractile and in such situations, the dosing set-point is adjusted based on the difference between the value of the pre-selected fractile and the threshold.

While the sensor 10 connected to the datalogger 5 may be able to determine the concentration directly as a concentration of $H_2S$, the method is not limited to such direct determination. In some embodiments, the determination of the concentration comprising measuring the concentration of a compound indicative of the concentration of the selected chemical substance. This may be viewed as an indirect measurement, since it resides in measuring another substance, which presence and concentration are linked e.g. by a chemical equilibrium between $H_2S$ and the substance for which concentration is determined. Further, the indication of the concentration could also be the presence of a compound which is indicative for that $H_2S$ cannot be formed e.g. $NO_3^-$.

While the method is fully functional by adjusting the dosing set-point based on e.g. the most recent determination of $H_2S$ concentration, it has been shown beneficial to consider a number of concentration determinations obtained during a time frame. In such embodiments, the determined concentration of $H_2S$ used in the adjustment of the dosing set-point is selected as the highest concentration (peak) value represented in a time series of most recent obtained concentration of $H_2S$ within a predefined time window. The length of the time window is typically user-set and may be set according to experiments.

Figure 2A:
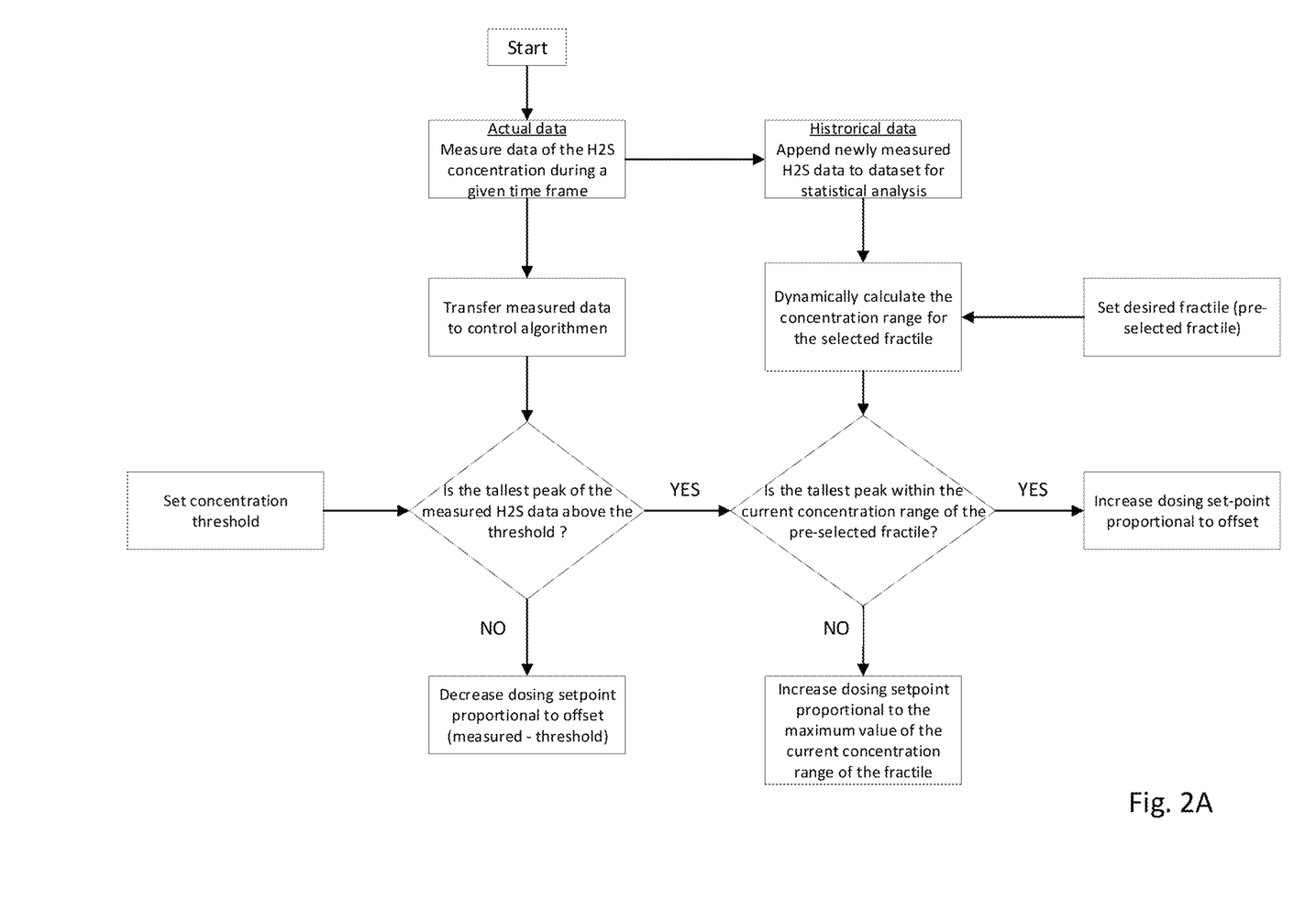
FIG. 2A is a flowchart illustrating an embodiment of adjusting a dosing set-point according to the invention.

FIG. 2A illustrates schematically an embodiment according to which the concentration used in the adjustment is a highest concentration value in a time series. As illustrated in FIG. 2A, the method begin with a determination of $H_2S$ during a given time frame. The determination data is transferred to a control algorithm and based on a set (typically by a user) concentration threshold, it is determined whether the tallest peak of the determined $H_2S$ is above the threshold. If yes, the dosing set-point is adjusted according to the difference between the determined concentration and threshold, which in the shown embodiments is implemented as the dosing set-point is increased proportional to the offset determined as determined concentration minus threshold.

As also illustrated in FIG. 2A, the newly determined $H_2S$ data (determinations of concentrations) is appended to a dataset of historical $H_2S$ data. While the dataset may be unbounded as to length and thereby time history, it has been found beneficial e.g. to limit the length of historical data to certain time span or events. Such time span may e.g. be hours, one or more days, one or more weeks, one or more months, one or more seasons and time span covering events which may be infrequent peak loads.

This data set is used for the statistical analyse determining the numerical value of the selected fractile. It is noted that in FIG. 2A, the wording "concentration range for the chosen fractile" is used to indicate that although a numerical value is assigned to the fractile, the value actually presents an upper limit of concentration range e.g. between [0:ppm] where the upper value is determined based on the selected fractile. By the repeatedly appending of data, a dynamic calculation of the fractile concentration range is obtained. As shown in FIG. 2, the concentration range is based on a desired fractile, pre-set as otherwise disclosed herein.

With the concentration range for the chosen fractile calculated, it is determined whether the tallest peak received from the parallel branch of the method (as illustrated) within the concentration range—or said in another manner—below the selected fractile, then the tallest peak is above threshold and below selected fractile, and the dosing set-point is increased proportional to the offset (determined as determined concentration minus threshold).

If, on the other hand, the tallest peak is below the threshold, the dosing set-point is decreased proportional to offset (determined as determined concentration minus threshold). Further, if the tallest peak is above both the threshold and the selected fractile, the dosing set-point is increased proportional to the value of the pre-selected fractile.

Figure 2B:
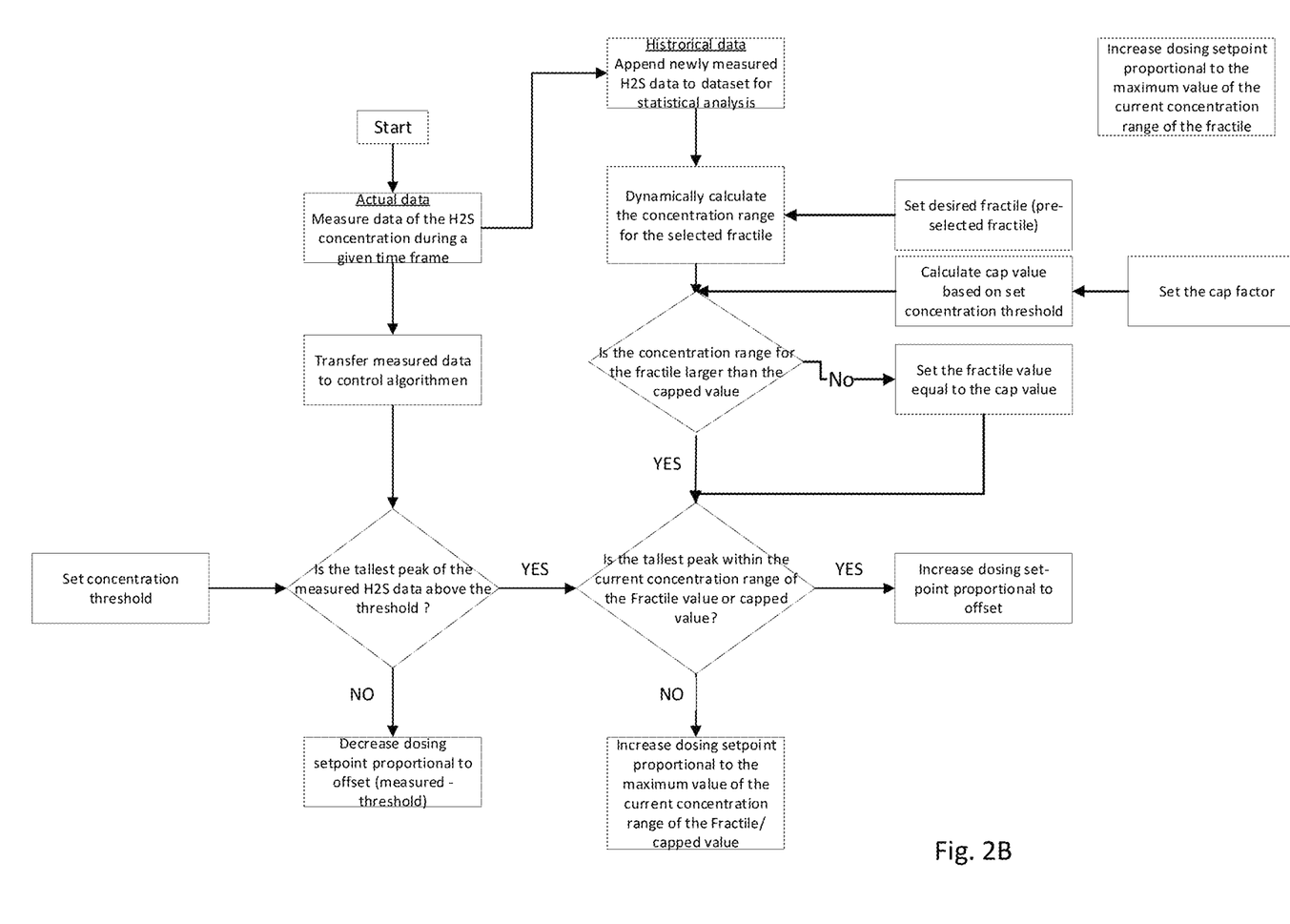
FIG. 2B is a flowchart illustrating a further embodiment of adjusting a dosing set-point according to which a cap is used according to the invention.
Figure 3:
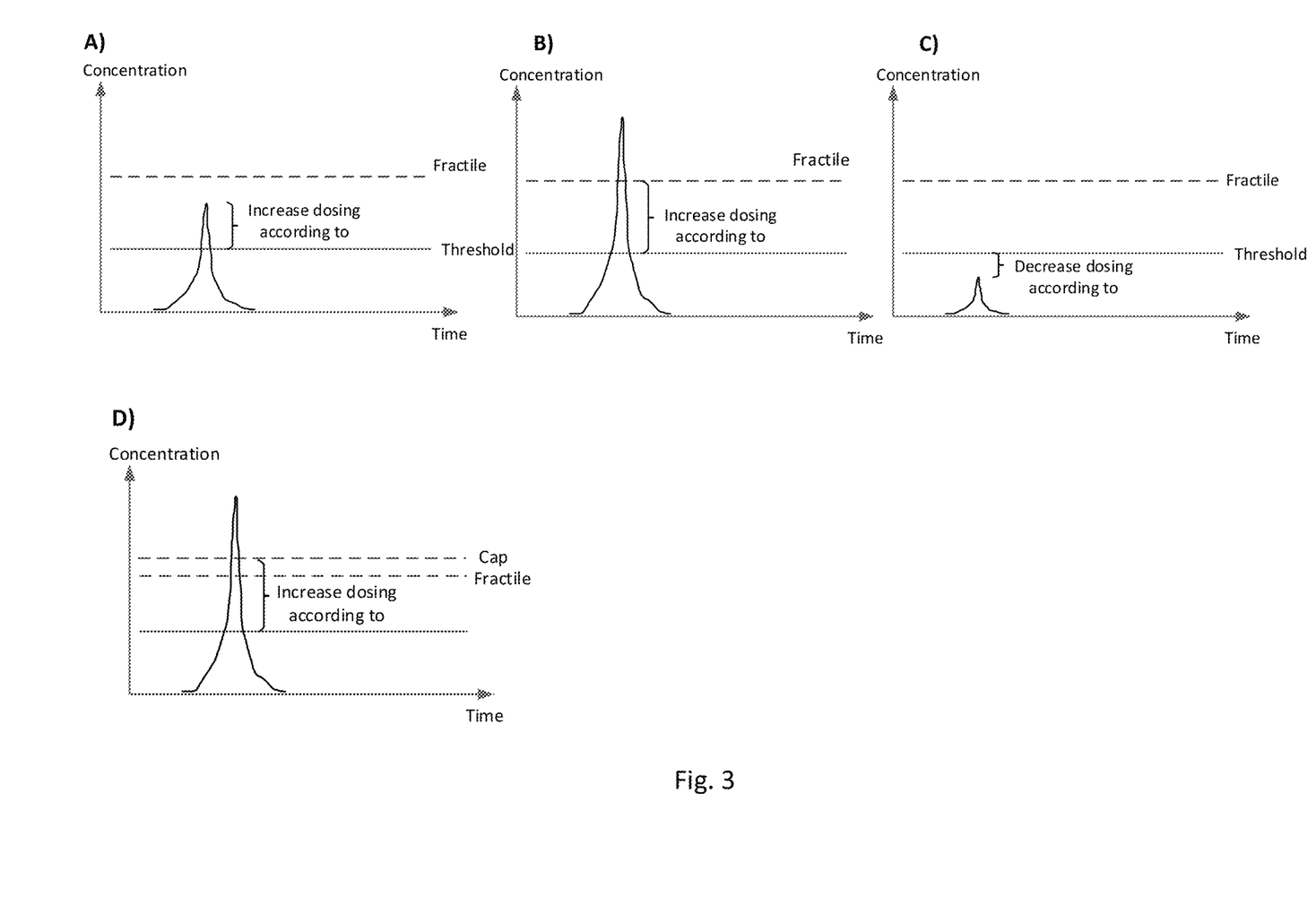
FIG. 3 is a set of graphs schematically illustrating different preferred embodiments of adjusting a dosing set-point depend on differences occurrences of fractile, threshold and determined concentration.

FIG. 2B illustrates schematically an embodiment according to which the concentration on which the adjustment is based is a highest concentration value in a time series or a capped value. The concept of this embodiment is also shown in FIG. 3D. With reference to FIG. 3D, a cap is introduced which is larger than the value of the preselected fractile. "Cap" refers to the implementation that if the statistical calculation determines the value of the preselected fractile being smaller than the cap, the value of the cap (cap value) substitute the statistical determined value of the preselected value. Thus, the cap can be viewed as setting a lower limit for the value of the preselected fractile which may be expressed as:
If the statistical determined value of the preselected fractile is smaller than cap value, then
value of preselected fractile:=cap
else
value of preselected fractile:=statistical determined value of preselected fractile.

As presented in FIG. 2B, this embodiment has many similarities with the method shown in FIG. 2A. However, in the embodiment of FIG. 2B a cap factor is introduced which typically is specified by a user. Based on the cap factor, the method calculates a cap value (e.g. expressed in ppm). A decision step is introduced disclosed as "Is the concentration range for the fractile larger than the capped value?" and if this is not the case, the fractile value is set to the cap value. It is noted that this can be viewed as an inversion of the rule above and may be expressed as
If the statistical determined value of the preselected fractile is NOT larger than the cap value, then
value of preselected fractile:=cap
else
value of preselected fractile:=statistical determined value of preselected fractile value.

The pre-selected fractile used in the present invention may be set in general arbitrary Typically, a fractile found applicable in connection with the present invention is the 80.0% fractile, such as the 85.0% fractile, preferably the 90.0% fractile, such as the 95.0% fractile, preferably the 97.5% fractile, such as the 99.0% fractile. In many preferred embodiments, the numerical value of the selected fractile (value of fractile) is given in ppm.

As detailed in connection with FIG. 2, the method typically operates on what may be labelled a dynamic dataset, as the determined concentration(s) of $H_2S$ at downstream position is(are) appended to the set of data from which the value of the pre-selected fractile is determined, and wherein the value of the pre-selected fractile is determined from this data set with appended determined concentration.

In a specific embodiment as the one shown in FIG. 2A, the set of data from which the value of concentration to be compared to the resulting concentration range of the preselected fractile is a selection of most recent determined concentrations of $H_2S$. By concentration range is herein meant the range between a lower value, typical zero, and an upper limit being the value of the preselected fractile. The number of the most recent data points (determinations/measurements) may often depend on a number of parameters of the system and the sampling rate of the datalogger.

The number is typically selected so the data set captures the dynamic behaviour of the wastewater and the abatement aimed at. Some characteristic number in case a sampling rate is 4 samples per minute is as less than 1000 most recent determinations, preferably less than 500 most recent determinations, such as less than 200 most recent determinations, preferably less than 100 most recent most recent determinations, and preferably more than 15 most recent determinations.

As disclosed in FIG. 2, a determination (measurement) of $H_2S$ concentrations is carried out during a given time frame. These determinations (data) are appended to a dataset comprising historical data (previous appended data). Thus, the method makes use of what can be labelled (in a non-limiting manner) "actual data" and "historical data". Thus, two time frames are involved and the time frame covered by the actual data is shorter than the time frame covered by the historical data.

The historical data is used to determine the value of the pre-selected fractile and the actual data is used to determine the concentration to be compared with the value of the pre-selected fractile.

Although it often is preferred to determine the value of the preselected fractile by a statistical method, it has been found beneficial in some embodiments, to cap the value of the fractile to a minimum value, such as but not limited to 1.25, 1.5 or 2 times the threshold. By cap is meant, that even if the statistical calculation determines the value of the preselected fractile as e.g. 1.15 times the threshold, the value is set to 1.25 (if this is the cap factor) times the threshold. By this, it is assured that the value of the fractile does not go below the threshold, which has been suggested to increase the stability of the adjustment procedure.

A further strategy for adjusting the dosing set-point may be to either maintain the dosing set-point un-adjusted or decreased if the determined concentration is equal to or lower than the threshold.

Reference is made to FIG. 3 illustrating various strategies as to adjustment of the dosing set-point. which may be applied in connection with the present invention. In FIG. 3 the formulation "increase dosing according to" and "decrease dosing according to" refers to according to the difference selected by the sign "1" Kindly observe that in FIGS. 3A), B) and C) the value of the preselected fractile is larger than the threshold.

In FIG. 3A), it is shown that the dosing set-point is increased if the determined concentration is higher than the threshold and lower than the value of the pre-selected fractile.

In FIG. 3B) it is shown that the dosing set-point is increased if the determined concentration is larger than the value of the preselected fractile, wherein the increase is based on the value of the pre-selected fractile.

In FIG. 3.C) it is shown that the dosing set-point is decreased if the determined concentration is lower than the threshold wherein the decrease is based on the threshold. Is noted that this case follows automatically by considering the numerical sign of the feature "if the determined concentration is lower than the value of the preselected fractile, then adjusting the dosing set-point based on the difference between the determined concentration and threshold" since the difference considered will be negative, whereby the adjustment will result in a decrease.

In FIG. 3D) it is shown that in case a cap is introduced. As shown in this example the cap value is larger than the statistically determined value of preselected fractile and the increase is carried out based on the cap value. As explained above in connection with FIG. 2B, such embodiments includes a further evaluation of determining whether value of the preselected fractile determined statistically is smaller (or "not larger") than the cap value and in confirmative situations replacing the statistically determined value of the fractile with the cap value.

As disclosed herein, the adjustment of the dosing set-point may be either an increase or a decrease (and in some instances no adjustment), where the increase or decrease is based on the difference between the determined concentration and the threshold. In some preferred embodiments, a new set-point (adjusted) is found by a linear relationship.

Such a linear relationship may be viewed as a rate of change of adjustment and may be based on the difference between the determined concentration and a present threshold, e.g. by $$SP_{new}=Gain*(C_{concentration}-Threshold)*SP_{present}$$

wherein $SP_{new}$ is the adjusted dosing set-point, $SP_{present}$ is the present dosing set-point, $C_{concentration}$ is the determined concentration, and Gain is an aggressiveness factor selected in accordance with a desired aggressiveness in the adjustment. Typically, the aggressiveness factor, Gain, is selected so that the adjustment is imposed harder than otherwise calculated by the difference. The actual value of Gain may vary over time and is typically set based on empiricism.

Similarly, if the determined concentration is higher than the value of the preselected fractile, the adjustment may be implemented as:

$$SP_{new}=Gain*(Value\ of\ preselected\ fractile-Threshold)*SP_{present}$$

with Gain determined as disclosed above.

In the disclosed embodiment, the $H_2S$ referred to may be dissolved sulphide (H2S(g), H2S(aq) or HS−(aq)) and the chemical agent dosed is iron in one of its common oxidation states (i.e. $Fe^{2+}$, $Fe^{3+}$ or $Fe^{6+}$).

The concentration determined in the disclosed embodiment may be obtained in a gas phase above a liquid phase and/or in the liquid phase of the wastewater.

Figure 4:
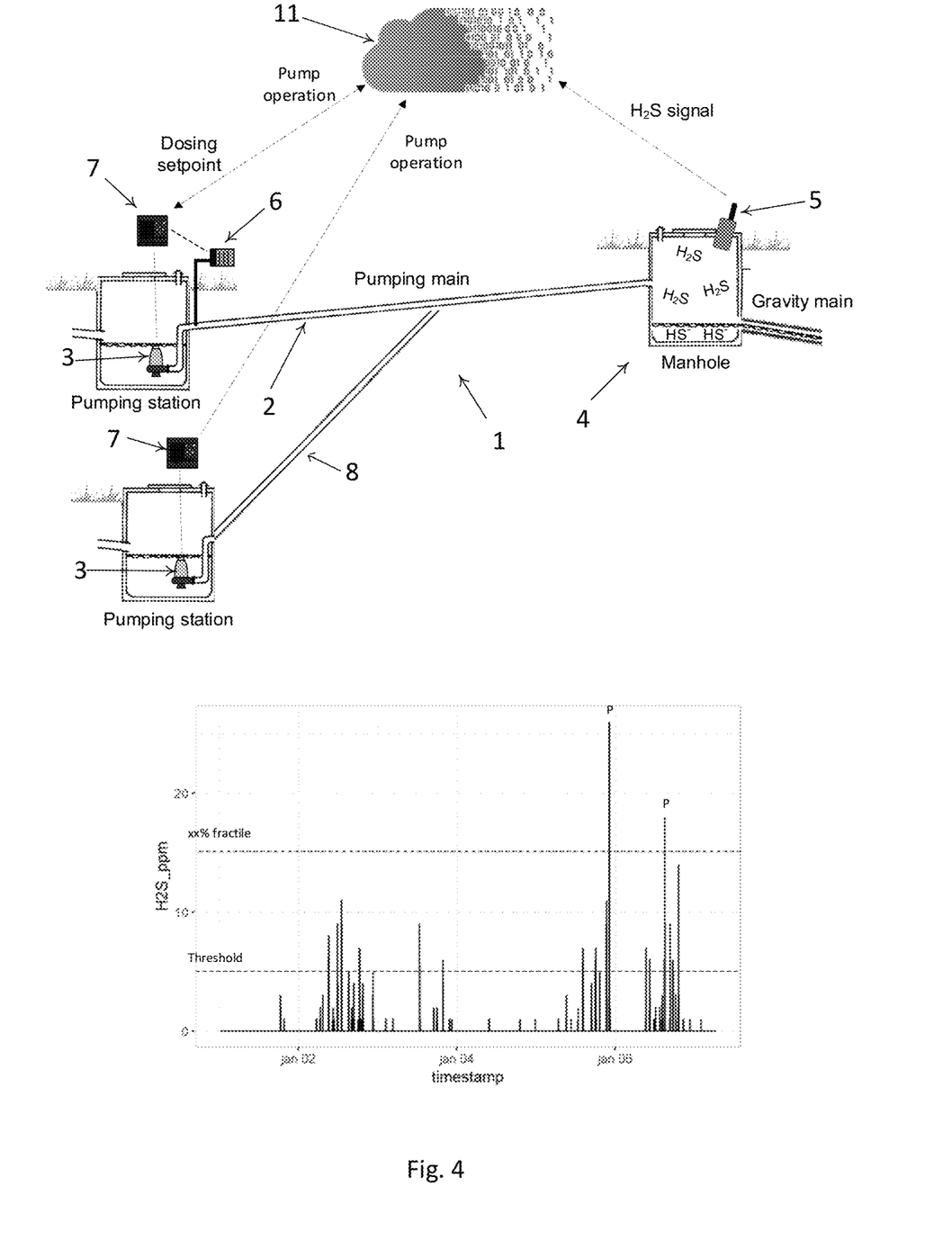
FIG. 4 is a schematic illustration of an embodiment of the invention employed in a wastewater system comprising a side-branch and determinations of concentrations obtained from the wastewater system.

Reference is made to FIG. 4 illustrating a further embodiment of the present invention. This embodiment has similarities with that of FIG. 1 although the embodiment of FIG. 4 contains a side branch 8. This side branch feeds wastewater into the pumping main 2 upstream of the manhole 4 and does not have a dosing unit for dosing chemical agent(s) into wastewater. The wastewater of the side branch mixes with the waste water in the pumping main 2. This a further complexity to the problem related to abatement since the side branch represents a source of wastewater to which no chemical agent(s) for abatement has been added. The right hand side of FIG. 4 illustrates concentration determinations obtained by the datalogger 5 with sensor 10 over time in the manhole 4 where peaks designated the number "P", originates from the side branch 8.

Compared to prior art method, with large peaks arriving infrequently, the prior art method will increase dosing drastically to combat $H_2S$ since the prior art method is based on the difference between threshold and peak height (as disclosed herein in the section "Background of the invention"). In the present invention, the concentration determined is compared to the value of the pre-selected fractile, whereby such infrequently occurring peaks may be viewed as being levelled-out. Such infrequently occurring peaks may be seen as representing something being different from what occurs during an ordinary operation of that specific system.

Examples

Figure 5:
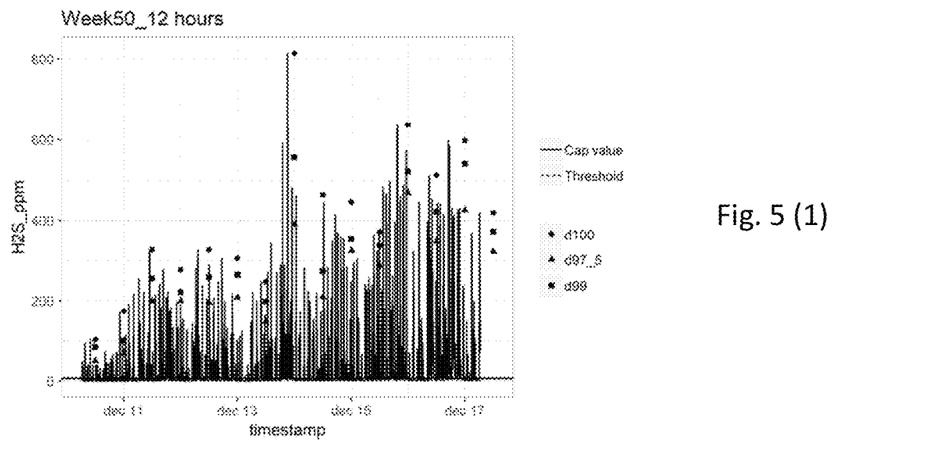
FIG. 5 illustrates different examples on use of the invention.

In FIG. 5 three examples are shown. FIG. 5(1) is an example on no chemical abatement whereas FIGS. 5(2) and (3) involves addition of chemical substances to abate $H_2S$.

FIG. 5(1) illustrates H2S signal without chemical treatment. The dynamic fractile approach as disclosed herein, using a 12 hour window can also be seen in this figure. Here it can be seen that the value of the 99% fractile corresponds almost to the maximum $H_2S$ peak, and as long as this is above the threshold (5 ppm), the dosing algorithm will increase setpoint. Depending on which fractile is used, the initial running in of the algorithm to a "steady" level might take a bit longer than prior art solutions, as the increase in set point is slightly less aggressive.

FIGS. 5(2) and (3) illustrate each $H_2S$ signals with chemical treatment where sporadic $H_2S$ peaks are present. As in FIG. 5(1) a 12 hour window can been seen in FIGS. 5(2) and 5(3). Here dosing has run for some time and most $H_2S$ peaks are kept below the threshold. The reaction of the algorithm in FIG. 5(3) for the 26 ppm peak will with this control get a limited impact on the dosing set point as this will only be adjusted according to a value of 9 ppm if the value of the 99% fractile is used. If the value of the 97.5% fractile is used, the adjustment will be based on the cap value (7.5 ppm) as disclosed in connection with FIG. 3D. For FIG. 5(2) the cap value will already have an effect when using the 99% fractile as the value of this is lower than the cap value, thus for the peak of 20 ppm the algorithm will adjust the dosing setpoint based on the difference between the cap value and the threshold.

The method according to the invention can be implemented by means of hardware, software, firmware or any combination of these. The invention or some of the features thereof can also be implemented as software running on one or more data processors and/or digital signal processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Waster water channel system
2 Pumping main
3 Pump
4 Manhole
5 Datalogger
6 Dosing unit
7 Control unit
8 Side branch
9 Pumping station
10 Sensor (in many situations, the sensor 10 and datalogger 5 are built together)
11 Cloud

The invention claimed is:

1. A method for abating the presence of a selected chemical substance in wastewater flowing in a wastewater channel system from an upstream position to a downstream position, the method comprising:
  dosing, via a dosing unit, into the wastewater, at the upstream position, at least one chemical agent adapted to abate the presence of said selected chemical substance, wherein the selected chemical substance includes one or more of sulphide, hydrogen sulphide, a sulphurous compound, methane, or nitrous oxide, wherein the dosing unit is operably connected to a control unit configured to instruct the dosing unit to dose chemicals in an amount set by a dosing set-point, and
  determining a threshold for the selected chemical substances, wherein said threshold is a maximum desired concentration of the selected chemical substance;
  determining a value of a pre-selected fractile based on a set of data comprising a time series of concentration determinations of the selected chemical substance at the downstream position within a predefined time window, and
  adjusting, via said control unit, the dosing set-point based on determinations of the concentration of the selected chemical substance at the downstream position wherein adjusting the dosing set-point comprising:
  obtaining, via a sensor operably connected to the control unit, a determination of concentration of the selected chemical substance at the downstream position, said sensor providing a sensor signal representing said concentration to said control unit, and
  i) if the determined concentration is lower than or equal to the value of the pre-selected fractile:
    adjusting the dosing set-point based on the difference between the determined concentration and the threshold, or
  ii) if the determined concentration is higher than the value of the pre-selected fractile:
    adjusting the dosing set-point based on the difference between the value of the pre-selected fractile and the threshold.

2. A method according to claim 1, wherein the obtaining the determination of the concentration of the selected chemical substance comprises measuring the concentration of the selected chemical substance or measuring the concentration of a compound indicative of the concentration of the selected chemical substance.

3. A method according to claim 1, wherein said determined concentration of the selected chemical substance is a highest concentration value represented in a time series of determinations of concentration of the selected chemical substance in the fluid within the predefined time window.

4. A method according to claim 1, wherein the pre-selected fractile is the 80.0% fractile.

5. A method according to claim 1, wherein the threshold is defined by a user.

6. A method according to claim 1, wherein the determined concentration of the selected chemical substance at said downstream position is appended to said set of data from which the value of the pre-selected fractile is determined.

7. A method according to claim 1, wherein the set of data from which the value of the preselected fractile is determined is a selection of determined concentrations of the selected chemical substances.

8. A method according to claim 1, wherein the value of the fractile is capped to a minimum value.

9. A method according to claim 1, wherein the dosing set-point is either maintained un-adjusted or decreased if the determined concentration is equal to or lower than the threshold.

10. A method according to claim 1, wherein the dosing set-point is increased if the determined concentration is higher than the threshold and lower than the value of the pre-selected fractile.

11. A method according to claim 1, wherein said adjusting the set-point is further adjusted by a linear relationship.

12. A method according to claim 1, wherein the selected chemical substance is dissolved sulphide and the chemical agent dosed is iron in one of oxidation states $Fe^{2-}$, $Fe^{3+}$, and $Fe^{6+}$.

13. A method according to claim 1, wherein the determined concentration of the selected chemical substance at the downstream position is obtained in a gas phase above a liquid phase and/or in the liquid phase of the wastewater.

14. A system for abating the presence of a selected chemical substance in a wastewater, said system comprising:

a dosing unit configured for dosing chemicals into the wastewater in accordance with a dosing set-point, a sensor configured for determining a concentration of the selected chemical substance formed in said fluid, wherein the selected chemical substance includes one or more of sulphide, hydrogen sulphide, a sulphurous compound, methane, or nitrous oxide, providing a sensor signal representing the concentration of sulphide, a control unit configured for:
  receiving said sensor signal, and
  determining a concentration of the selected chemical substance based on the received sensor signal,
  determining a threshold for the selected chemical substance, wherein said threshold is a maximum desired concentration of the selected chemical substance,
  determining a value of a pre-selected fractile based on a set of data comprising a time series of concentration determinations of the selected chemical substance,
  determining at least one of an un-adjusted dosing set-point or an adjusted dosing set-point, wherein the determining includes:
    i) determining if the determined concentration is lower than or equal to the value of the pre-selected fractile, then the dosing set-point is un-adjusted, or
    ii) determining if the determined concentration is higher than the value of the pre-selected fractile, then the dosing set-point is adjusted based on the difference between the value of the pre-selected fractile and the threshold, and
  instructing the dosing unit, when chemicals are to be dosed, to dose chemicals in accordance with said un-adjusted or said adjusted dosing set-point into the wastewater at an upstream position.

15. A wastewater channel system comprising the system according to claim 14 and at least one flow channel configured to provide a flow of wastewater from an upstream position to a downstream position, wherein the flow channel being configured to provide said flow by gravitational flow or flow forced by a pump, and wherein the dosing unit is arranged at the upstream position and the sensor is arranged at the downstream position.

16. The wastewater channel system according to claim 15, further comprising:
  one or more side branches each of which is connected to said flow channel to feed wastewater into said flow channel at the downstream position or between the upstream of the downstream position.

17. The wastewater channel system according to claim 15, wherein the adjusted dosing set-point is further adjusted by a linear relationship.

18. The wastewater channel system according to claim 15, wherein the value of the fractile is capped to a minimum value.

* * * * *